United States Patent [19]

Sluyters

[11] Patent Number: 4,808,277

[45] Date of Patent: Feb. 28, 1989

[54] METHOD FOR THE CONTINUOUS ELECTROLYTIC PLATING OF A METAL STRIP WITH A METALLIC PLATING LAYER

[75] Inventor: Johannes H. Sluyters, Zeist, Netherlands

[73] Assignee: Hoogovens Groep B.V., Ijmuiden, Netherlands

[21] Appl. No.: 197,512

[22] Filed: May 23, 1988

[30] Foreign Application Priority Data

Jun. 4, 1987 [NL] Netherlands .................... 8701307

[51] Int. Cl.$^4$ .............................................. C25D 7/06
[52] U.S. Cl. ...................................................... 204/28
[58] Field of Search .......................................... 204/28

[56] References Cited

U.S. PATENT DOCUMENTS 2,895,888 7/1959 Varner ................................... 204/28
3,827,963 8/1974 Callahan ............................. 204/228

Primary Examiner—T. M. Tufariello
Attorney, Agent, or Firm—Stevens, Davis, Miller & Mosher

[57] ABSTRACT

To form a plating layer on a metal strip by continuous electrolytic plating, the strip is continuously passed, as the cathode, through an electrolytic cell in which there is at least one anode and electrolyte. In order to monitor the plating layer during its formation, a beam of electromagnetic radiation is directed at the strip at a location after the strip enters the cell and the intensity radiation scattered from the strip surface at a predetermined angle is measured. This provides information about the plating layer formation, e.g. formation and growth of crystallization nuclei, which can be used to adjust the electrolysis process.

11 Claims, 2 Drawing Sheets

METHOD FOR THE CONTINUOUS ELECTROLYTIC PLATING OF A METAL STRIP WITH A METALLIC PLATING LAYER

BACKGROUND OF THE INVENTION

1. FIELD OF THE INVENTION

The invention relates to a method for the continuous electrolytic plating of a metal strip with a metallic plating layer in which the strip is continuously passed as cathode through an electrolysis cell having an anode, the plating layer being deposited on the strip from an electrolyte between the strip and the anode.

In the following the invention will be discussed with particular reference to the manufacture of tin plate, but is not restricted to this application and is also applicable to other plating processes, such as electroplating with other metals such as zinc, cadmium, chromium, nickel, lead, gold or with alloys of these and electroplating with co-deposits such as zinc with aluminum oxide for example.

2. DESCRIPTION OF THE PRIOR ART

In the manufacture of tin plate by continuous electrolysis, a known phenomenon occurring in practice is that at particular locations on the strip surface more tin is deposited than at other places. In order to overcome this defect, which can lead to rejection of the tin plate on grounds of quality, , an additive, a so-called brightener, is included in the electrolyte, which influences the formation of crystallization nuclei (so called nucleation) and their growth. It is generally assumed that the deposition process at particular active locations on the surface of the strip, where more crystallization nuclei are formed which grow more rapidly, is delayed by the brightener, so that an evenly distributed plating layer is achieved. However, the brightener causes the charge transfer reaction to become slower, so that the energy consumption increases.

In practice this occurrence of non-uniform plating is observed after the tin plate has been manufactured. The tin plate manufactured subsequently in the same plating line therefore has the same defect, and may also need to be rejected.

Some attempts to monitor the formation of a plating layer, for various purposes, are described in the prior art.

In U.S. application Pat. No. 2,895,888, in a continuous plating process, it is proposed to measure final plating thickness of tin or zinc on strip by means of a nuclear beta radiation reflection gauging system located after the electrolysis cell. The reflected beta radiation is detected and used to calculate the plating layer thickness which is compared with a desired thickness. From this comparison, adjustment of the electrolysis current is made.

U.S. application Pat. No. 3,827,963 describes a batch process of electrolytic plating in which the progress of the layer formation is watched using a light beam directed at the work-piece being plated throughout the plating process. Light reflected from the work-piece is measured and compared with a target value. The target value may represent the desired end of plating, or a desired point at which the process is switched from current mode to halo mode.

Similarly, DE-A-No. 2,312,578 described an anodizing batch process in which a reflected light beam is used to monitor progress of the layer formation, e.g. to determine when the desired layer is formed.

SUMMARY OF THE INVENTION

The object of the present invention is to provide a method for the continuous electrolytic plating of a metal strip with a metallic plating layer, in which the formation of a non-uniform plating layer is observed in good time, so that measures can be taken early to achieve a more uniform plating layer.

According to the invention, a substantially parallel beam of electromagnetic radiation is directed onto the strip at a location after the strip begins to undergo electrolysis in the cell and preferably at a location where it is undergoing electrolysis in the cell, and the intensity of the radiation scattered by the strip in a predetermined direction is measured. Information is obtained from this measurement concerning the formation of the metallic plating layer on the strip. Preferably, the plating layer is monitored while it is being formed and not after it is formed.

Preferably the distance between the location where the electrolytic plating of the strip begins and the location where the beam of radiation is directed onto the strip is chosen so that, from the intensity of the radiation scattered by the strip, information is obtained about the formation (nucleation) and growth of crystallization nuclei in the metallic plating layer and their distribution on the surface of the strip. The advantage of this is that, during the manufacture of the plated substrate, information is obtained about the formation of the plating layer and in particular the formation of an unevenly distributed plating layer.

In order to reduce or prevent a non-uniform plating layer, preferably the measured value of the intensity of the radiation scattered by the strip is compared with a predetermined set point value, and one or more parameters of the electrolytic plating process are adjusted in dependence on the difference between the measured and the set point values. Preferably the electrical current density of the electrolytic plating process and/or the quantity of brightener in the electrolyte are the adjusted parameter or parameters. By this feedback control of the electrolytic plating process, a rapid reaction to the formation of a non-uniformly distributed plating layer is achieved.

It is important to note that the detected radiation is the scattered radiation, not reflected radiation. The beam of radiation should be homogeneous and may be monochromatic. In a preferred embodiment the beam of electromagnetic radiation is a beam of light. Although the angle at which the beam is directed onto the strip and the angle at which the intensity of the radiation scattered by the strip is measured can be selected within broad limits, the preference is to direct the beam perpendicularly or almost perpendicularly onto the strip and to measure the intensity of the radiation scattered by the strip at an angle of approximately 45° to the strip. In these circumstances good information on the formation of the plating layer is obtained.

Preferably also the beam of electromagnetic radiation is directed onto the strip at a location where the strip passes over a roller. The advantage of this is that the of the strip in the direction perpendicular to the strip surface which might influence the measurement, is entirely or almost entirely eliminated.

BRIEF INTRODUCTION OF THE DRAWINGS

Embodiments of the invention will be described below by way of non-limitative example, with reference to the accompanying drawings, in which.

DESCRIPTION OF THE PREFERRED EMBODIMENTS

Figure 1:
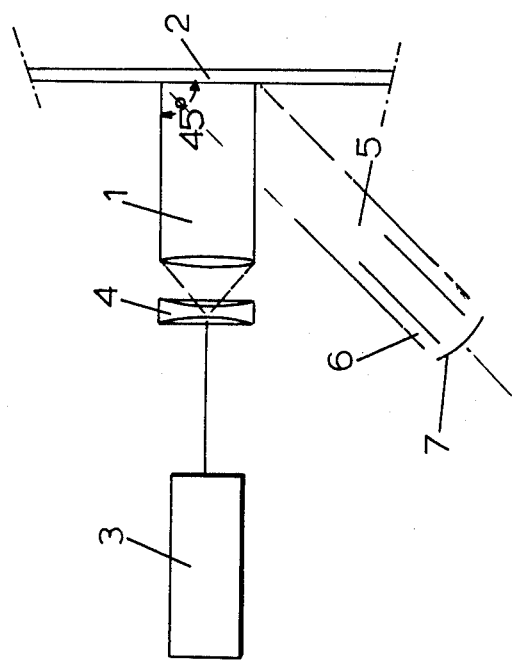
FIG. 1 shows the principle of the measuring system which is used in the method of the invention.

In FIG. 1 a substantially parallel and homogeneous beam of electromagnetic radiation 1 is shown directed perpendicularly onto the surface of the moving metal strip 2. For example, this beam 1 is a light beam produced by a light source 3, such as a laser, and a lens system 4. The intensity of the scattered light 5 from the strip 2 is measured at an angle of approximately 45° to the strip surface by means of a collimator 6 and a photoelectric cell 7.

Figure 2:
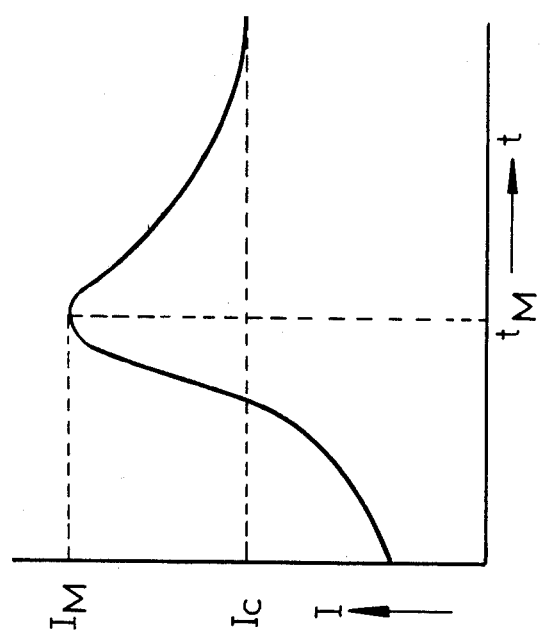
FIG. 2 shows a measurement signal from the measuring system of FIG. 1.

In FIG. 2 on the vertical axis is plotted the intensity I of the scattered light as measured with a stationary substrate as a function of the time t after energising (starting up) an electrolysis cell plotted along the horizontal axis. The intensity initially rises to a maximum $I_M$ which is achieved after a time $t_M$. Then the intensity falls to a constant or almost constant value $I_c$.

The maximum $I_M$ and the constant value $I_c$ are a measure of the number of crystallization nuclei formed on the strip surface and their speed of growth and, in a cell for continuously plating moving strip, are dependent among other things on (a) the electric current density in the electrolysis cell,
(b) the nature and the quantity of brightener in the electrolyte,
(c) the concentration of the ions of the metallic plating layer in the electrolyte,
(d) the temperature of the electrolyte,
(e) the speed of the strip,
(f) the chemical composition of the substrate and the nature of its surface.

Figure 3B:
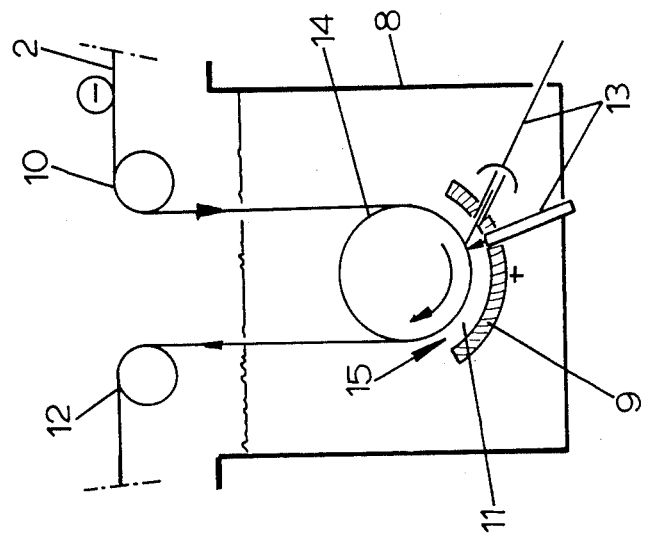
FIGS. 3A and 3B show examples of application of the measuring method in an electrolysis cell.
Figure 3A:
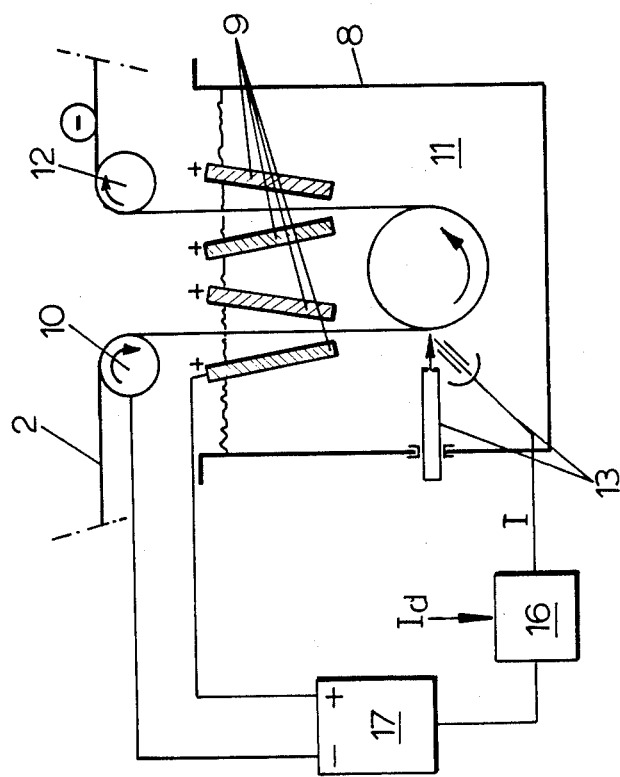

FIG. 3A shows an electrolysis cell 8 of a type with consumable anodes 9 which is customary in conventional tinplate mills. The strip 2 which forms the cathode passes over a roller 10 into the electrolysis cell 8 filled with electrolyte 11. The strip moves along the anodes 9 where ions from the plating metal are deposited onto the strip from the electrolyte between the strip and the anodes. The strip then passes out of the electrolysis cell and passes to the next electrolysis cell via a roller 12. A diagrammatically shown measuring system 13 of a type illustrated in FIG. 1 is incorporated in the electrolysis cell 9.

FIG. 3B shows an electrolysis cell 8 of a radial type with an insoluble anode 9. The strip 2 which acts as the cathode passes via roller 10 into the electrolysis cell 8, where it moves over a cathode roller 14 along a curved anode 9. In the example shown in FIG. 3B the electrolyte 11 is fed into the gap between the cathode roller 14 and the strip 2 on one side and the anode 9 on the other at the position 15. Ions from the plating material are deposited from the electrolyte 11 onto the strip 2. The strip then passes out of the electrolysis cell via a roller 12. A diagrammatically shown measuring system 13 of the type illustrated in FIG. 1 is incorporated in the electrolysis cell. The measuring system can however be mounted (not shown) outside the electrolyte bath, for example at the location of roller 12.

In the examples of both FIG. 3A and FIG. 3B several measuring systems 13 can be fitted over the width and in the longitudinal direction of the strip. The strip can also be scanned over its width. By this means more information about the distribution of variations over the strip surface is gathered. For variations in the longitudinal direction of the strip one measuring system 13 may be sufficient, placed for example in the middle of the strip.

With the measuring system 13, measurements are taken at a point in the electrolysis cell corresponding to a time $t \geq t_M$ in FIG. 2. With a constant strip speed V in the plating line the strip must have covered a distance $S \geq S_M$ since the beginning of plating the strip, wherein $S_M$ is the distance the strip has covered in time $t_M$ at speed V.

FIG. 3A also shows an example of the use of the measurement signal from the measuring system 13 for controlling the electrolytic plating process. The measured intensity I of the scattered light is compared with a set point value $I_D$ in the control and regulating unit 16. When there is a difference between the measured value of I and the set value $I_D$, then there is a variation in the formation and growth of crystallization nuclei in the plating layer and/or their distribution. The difference can consist of a component which, if no action is taken, indicates a constant variation or a variation which changes slowly with time and one or more components which represent variations changing much more quickly in time. In this case one or more parameters of the electrolytic plating process are adjusted in dependence on the difference between the measured value I and the set value $I_D$.

To correct deviations in the plating layer, the main preference is for (a) adjusting the electrical current density in the electrolysis cell and (b) adjusting the nature and quantity of the brightener in the electrolyte, or a combination of both. The process parameter (a) is more suitable for rapid reaction, for example in the case of a rapidly changing variation. FIG. 3A shows that the power supplied to electrolysis cell 8 is adjusted by control of the rectifier 17.

Displacement of the strip in the direction perpendicular to the strip surface influences the measurement of the intensity of the scattered light. This can be prevented by using a homogeneous beam, which is much wider than the collimator, so that only the radiation coming from a surface area whose size of which is completely determined by the collimator is detected. Another solution to this problem is to measure the intensity of the scattered light at a place where the strip passes over a roller, either a guide roller as in FIG. 3A or the cathode roller as in FIG. 3B, so that the position of the strip in a direction perpendicular to the strip surface is clearly defined.

The nature of the beam of electromagnetic radiation is chosen in relation to the number, size, mutual separation and the nature of the crystallization nuclei on the strip surface. A good measurement signal has been obtained with a light beam in a number of plating processes.

What is claimed is:

1. Method for the continuous electrolytic plating of a metal strip with a metallic plating layer, comprising the steps of (i) passing the strip continuously through an electrolytic cell having an anode and an electrolyte, said strip acting as cathode in the cell, while performing electrolysis in the cell so that said plating layer is deposited on the strip from the electrolyte, and (ii) monitoring the plating layer on the strip during its formation in the cell, by directing a substantially parallel beam of electromagnetic radiation onto the strip at a location which in the direction of movement of the strip is after the commencement of the electrolysis in the cell, and measuring the intensity of the resulting radiation scattered from the strip in a predetermined direction, said measured intensity providing information about the formation of the plating layer on the strip.

2. Method according to claim 1 wherein said location at which the beam is directed onto the strip is at a selected distance after the location of commencement of electrolytic plating of the strip in the cell such that, from said measured intensity of the scattered radiation, information is obtained about the nucleation and growth of crystallization nuclei of the plating layer and their distribution on the strip.

3. Method according to claim 1 further including the step of comparing said measured intensity of scattered radiation with a predetermined value and adjusting at least one parameter of the electrolysis in dependence on the difference between the measured intensity and the predetermined value.

4. Method according to claim 3 wherein said at least one parameter adjusted comprises the electric current density of the electrolysis.

5. Method according to claim 3 wherein said at least one parameter adjusted comprises the quantity of brightener in the electrolyte.

6. Method according to claim 1 wherein said beam is a beam of light.

7. Method according to claim 1 wherein said beam is directed substantially perpendicularly onto the strip.

8. Method according to claim 1 wherein said predetermined direction at which the intensity of scattered radiation is measured is 45° to the strip.

9. Method according to claim 1 including passing the strip around a support roller in said cell, said location at which the beam is directed onto the strip being at said support roller.

10. Method according to claim 1 wherein said strip is steel strip.

11. Method according to claim 1 wherein said plating layer is a tin layer.

* * * * *